UNITED STATES PATENT OFFICE.

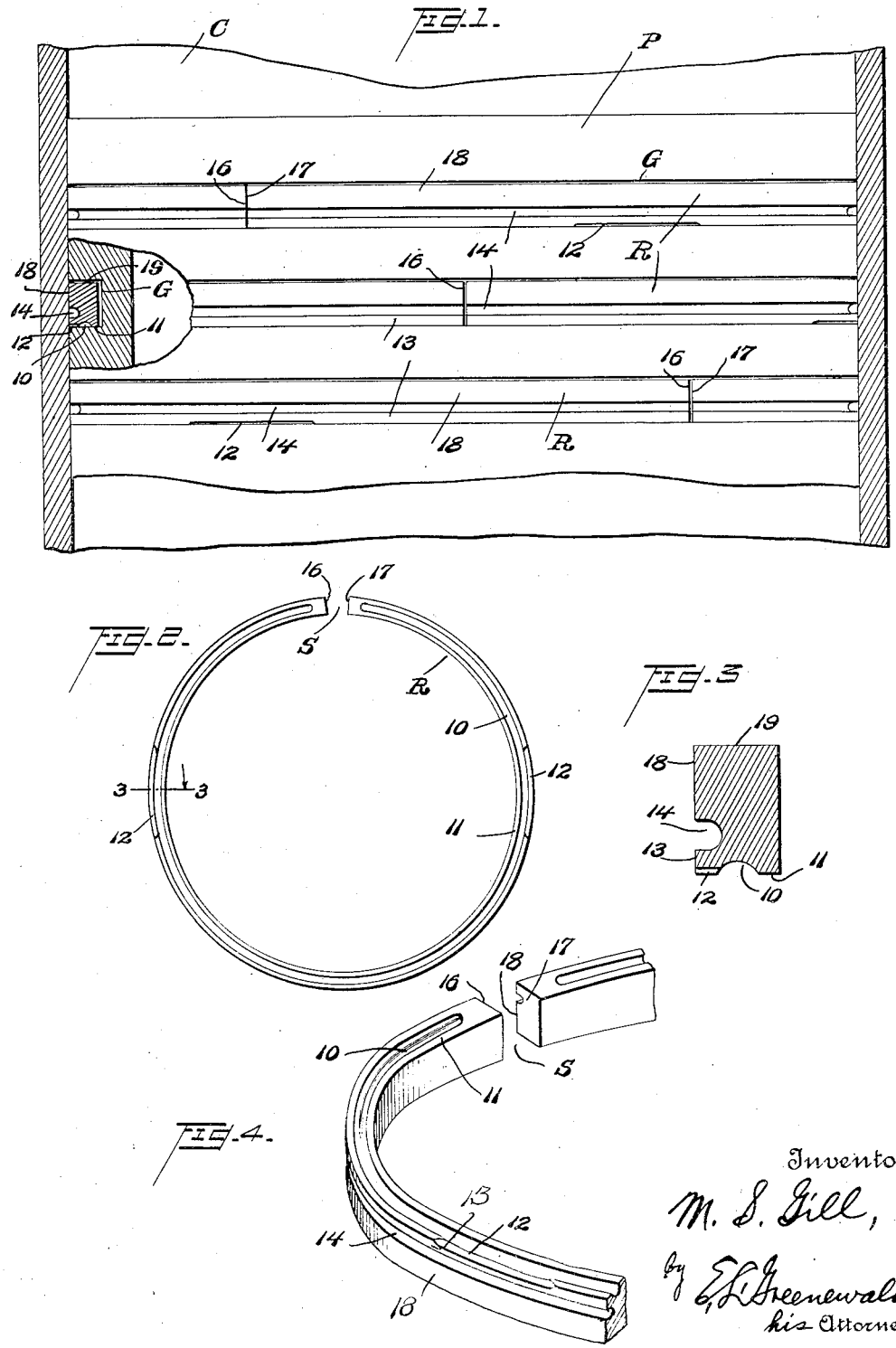

MIDDLETON S. GILL, OF SAN FRANCISCO, CALIFORNIA.

PISTON-RING.

1,354,548.  Specification of Letters Patent.  Patented Oct. 5, 1920.

Application filed January 9, 1920. Serial No. 350,356.

*To all whom it may concern:*

Be it known that I, MIDDLETON S. GILL, a citizen of the United States, residing at San Francisco, in the county of San Francisco and State of California, have invented certain new and useful Improvements in Piston-Rings; and I do hereby declare the following to be a full, clear, and exact description of the invention, such as will enable others skilled in the art to which it appertains to make and use the same.

This invention relates to piston rings and particularly to a piston packing ring adapted to prevent leakage past the joint between the ring and the piston as well as past the joint between the ring and the cylinder wall.

The piston ring of the present invention comprises an improvement on the piston ring disclosed in my co-pending application Serial No. 300,615, filed May 29, 1919. As set forth in my co-pending application, piston rings now generally in use successfully prevent leakage of gas and oil past the piston packing-ring during the compression stroke of the engine but are not efficient in preventing leakage of oil and gas past the joint between the ring and piston during the power or working stroke, because the proper seal is not at all times maintained between the piston ring and the piston. I have discovered that it is necessary at all times to maintain a gas and oil tight seal between the piston ring and the piston as well as between the piston ring and cylinder wall, and generally speaking, the principal object of the present invention is to provide a piston ring that shall maintain a perfect gas and oil tight seal at all times between the piston ring and the piston as well as between the piston ring and the cylinder wall.

In my co-pending application above referred to, I have disclosed a piston ring that successfully accomplishes this object. This piston ring is a one-piece ring of resilient material split transversely at one point and provided with overlapping or interfitting ends, and has an annular groove in one of its edge faces and a circumferential groove in the outer peripheral face thereof. The edge face of the ring containing the annular groove has outwardly extending narrow and relatively deep channels or nicks, forming relief ports connecting this groove with the outer periphery of the ring, and the annular and circumferential grooves extend near to but do not cross the joint between the overlapping ends of the ring. However, longitudinally extending pressure-relief channels at intervals in the outer periphery of the ring establish communication between the circumferential groove and the space above the upper edge of the ring or the space that communicates with the combustion chamber.

The piston ring shown and described in my co-pending application is a satisfactory one and is effective in preventing leakage of gas and oil past the joints between the piston ring and the piston and between the piston ring and the cylinder wall. However, I have found that the channels or nicks in the edge of the ring that form the narrow, relatively deep relief ports between the groove and the outer periphery of the ring weaken it so that in expanding the ring when applying it to the piston, and even in use, the ring may snap or break at these places. Furthermore, the narrow passages formed by these nicks or channels may in time clog with deposits, such as carbon, rendering them useless as ports to relieve the pressure in the edge groove. In order to overcome this disadvantage I have devised an improved construction in which the ring is provided with long, comparatively shallow relief passages or ports in place of the narrow and relatively deep channels. I have also arranged these improved shallow passages at points along the lower edge face of the ring about 90° from the split in the ring, which arrangement has several advantages, the principal one being that portions of the ring are removed only at places where there is a minimum of strain on the ring when it is applied to the piston, another advantage being that the relief ports are arranged at places in the annular groove which are spaced from the ends of the groove and from each other so that any gases leaking at any place along the ring into the annular groove in the edge face will have but a short distance to travel to reach a relief port, thereby almost immediately relieving any pressure that gathers in the annular edge groove and preventing the possibility of the seal between the piston ring and piston being broken.

I have furthermore discovered that it is practically unnecessary to provide a tight or overlapping joint between the opposed ends of a piston ring. I have found that it is sufficient for practical purposes to initially make the ring with opposed ends whose faces are disposed in radial planes so that they will abut face to face or even leave a very narrow space between such ends. The resulting leakage through any space between the opposed ends of the ring is of no practical importance and by the time the ring wears so that this space is enlarged considerably the ring will be otherwise worn out and unfit for use. I utilize the intervening very narrow space between the opposed ends of the piston ring as a pressure equalizing passage that establishes communication between the circumferential groove in the peripheral face of the ring, which groove is cut so that it extends circumferentially throughout the length of the outer peripheral face of the ring and opens into the faces at the ends of the ring and the space between these ends. The pressure is thus equalized on all sides of the surface of that portion of the ring above the circumferential groove, and this portion of the ring has therefore no sealing function but is necessary as a wearing and guiding surface and also stiffens the ring and renders it mechanically less fragile. By constructing the ring with non-overlapping ends and with the circumferential groove opening into the space between the opposed ends of the ring, the cost of manufacturing the ring is considerably reduced, as I am thus able to dispense with the specially formed pressure equalizing channels disclosed in my copending application, above referred to, and also avoid the expense of forming interfitting or overlapping ends on the ring, since the formation of the ends of my improved ring is a much simpler operation.

The foregoing and other objects and the novel features of my invention will be apparent from the following description taken in connection with the drawings, in which—

Figure 1 is a view illustrating my invention, the same being partly in section and partly in side elevation showing so much of a cylinder and piston as is necessary to illustrate the use of rings embodying my invention;

Fig. 2 is a bottom plan view of a piston ring embodying my invention;

Fig. 3 is an enlarged sectional view of the piston ring embodying my invention, the section being taken on line 3—3 of Fig. 2; and Fig. 4 is a detail view illustrating a portion of the piston ring.

While I have here illustrated the invention as applied to an internal combustion engine, such as an automobile engine, it will be understood that piston rings embodying my invention may also be used with other types of engines employing motive fluid, such as steam engines.

Referring to Fig. 1, C designates the cylinder wall of a gas or internal combustion engine, the same being herein shown for purposes of illustration as of the vertical type, commonly used on automobiles, the combustion chamber being assumed to be in the space A above the piston P that is mounted in the usual manner within the cylinder. The piston P may be of any suitable or preferred construction and as herein illustrated is provided with one or more circumferential piston ring grooves G each adapted to receive a piston ring embodying my invention.

The piston ring embodying my invention is generally designated by the reference letter R and consists of a one-piece substantially annular metal member of resilient material, such as cast iron. One edge face of the ring R is provided with a groove 10 that leaves a sealing surface 11 along the inner and lower edge of the ring which serves as the surface for forming and holding the gas and oil seal between the piston ring and the piston. The groove 10 extends substantially the entire length of the lower edge face of the ring but not across the joint or split, the ends of the groove terminating adjacent the ends of the ring. The groove 10 is connected by two long, outwardly extending and comparatively shallow relief ports 12, 12 to the outer peripheral face of the ring. These ports are for the purpose of relieving any gas pressure that might collect in the groove 10 by gas leaking past the seal between the piston ring and piston. The seal between the piston ring and the cylinder wall is effected by a sealing surface 13 that is disposed between the circumferential groove 14 and the lower edge face that contains the groove 10.

In order that the seal between the piston ring and piston shall not be broken at any time, the sealing surfaces are so proportioned that the seal made by the sealing surface 11 will never be broken by the frictional pressure between the sealing surface 13 and the cylinder wall. In other words, the sealing surface 13 is of such width that the frictional pressure between it and the cylinder wall will be less than the sealing pressure exerted between the sealing surface 11 and the lower side wall of the ring-receiving groove of the piston, so that at no time will there be sufficient friction between the sealing surface 13 and the cylinder wall to overcome and break the seal that is made by the sealing surface 11. I have found that a desirable and efficient form of ring is one which is designed so that the distance between the outer edge of the sealing surface 11 or the inner edge of the annular face 11 or the inner edge of the annular groove 10 and the outer peripheral edge of the piston ring is about twice the width of the sealing surface 13. Of course, I do not wish to be limited to such proportions but mention them as an example of a ring construction that I have found to be particularly effective in practice.

The circumferential channel or groove 14 opens into the space between the opposed ends 16 and 17 at the split S and is at all times in communication with this space so as to equalize the pressure on the peripheral wearing and guiding surface 18 between the groove 14 and the upper edge face 19 of the ring. The opposed ends 16 and 17 of the ring at the split S are cut so that they are disposed in substantially radial planes, and are normally spread apart by the inherent resiliency of the ring, as indicated in Fig. 2, but when placed in position in the ring-receiving groove of the piston these ends are forced to substantially abut against one another, as indicated in Fig. 1, in any event leaving only a slight space between them. The joint between the ends of the ring is not intended to be absolutely gas tight, so that communication will at all times be established through this space between the circumferential groove 14 and the space adjacent the upper edge of the ring, which space or edge is disposed nearest the combustion chamber of the cylinder when the piston and ring are in place in the cylinder, as indicated in Fig. 1.

It appears that the operation of my improved ring depends upon the fact that the combined gas pressure and resiliency of the ring serving to hold the sealing surface 13 against the cylinder wall, while sufficient to prevent leakage past the ring and the cylinder wall, is at no time sufficient to cause the piston ring to pull away from the lower side wall of the ring-receiving groove to break the seal between the piston ring and the piston. In piston rings heretofore employed, gas and oil have leaked past the joint between the piston ring and the piston from the moment that the piston ring breaks contact with the lower wall of the ring-receiving groove until the ring makes contact with the upper wall of the ring receiving groove, but, as before stated, I avoid breaking the seal between the piston ring and piston at any time, and thus prevent leakage at all times.

Assuming that one or more piston rings are in position on the piston P, as indicated in Fig. 1, the operation of the ring during a cycle is substantially as follows: On the up or compression stroke of the piston the sealing surface 13 is held in engagement with the cylinder wall and prevents leakage between the piston ring and the cylinder wall, and there will be practically no leakage through the space between the abutting ends 16 and 17 of the ring, but any leakage between these abutting ends will be of no consequence whatever where the joints of the several rings on the piston are staggered. The gas pressure against the upper edge 19 of the piston ring will hold the sealing surface 11 against the lower side wall of the ring-receiving groove, during compression, to maintain a seal between the piston ring and piston. At the beginning of the working stroke, the piston rings, as heretofore constructed, tend to lag behind the piston, as already explained, breaking the seal between the piston ring and the piston for an instant, which is of sufficient duration to permit the leakage of gas from the combustion chamber and the leakage of oil into the combustion chamber. At the beginning of the working stroke, in the present invention, the sealing surface 11 of the piston ring R is held by pressure in the position that it occupied during the compression stroke and maintains the seal, preventing the leakage of oil and gas past the joint between the piston and piston ring. By maintaining the seal between the piston ring and the piston, very marked economies in the consumption of fuel and lubricating oil are effected, and furthermore, the formation of carbon deposits in the combustion chamber and around the spark plugs is prevented.

While I have shown and described my improved piston ring in detail, it is to be understood that certain modifications and changes may be made therein without departing from the spirit of my invention.

What I claim is:

1. A piston ring having a groove in one edge face and a long, shallow passage extending outwardly from said groove.

2. A piston ring having a split at one point and a groove in one edge face thereof that extends adjacent to but not across said split, and long, shallow passages extending from said groove outwardly to the outer peripheral edge of the ring, said passages being arranged on substantially diametrically opposite sides of the ring.

3. A piston ring transversely split at one point to provide opposed ends, said ring having a circumferential groove in the peripheral face that communicates with the space between said opposed ends, said ring also having a groove in one of its edge faces and a passage extending outwardly from said groove in the edge face of the ring.

4. A piston ring having opposed end faces disposed in substantially radial planes, a circumferential groove in its peripheral face that communicates with the space between said opposed ends, a groove in one of its edge faces, and passages extending outwardly from the last mentioned groove to the outer peripheral face of the ring.

5. A piston ring having a circumferential groove in its peripheral face that is in communication with one edge face of the ring and the space adjacent said edge face, a groove disposed in and extending longitudinally of the other edge face of the ring, and long, shallow passages extending outwardly from said last mentioned groove.

6. A one-piece piston ring transversely split at one point to provide opposed ends, said ring having a circumferential groove in its outer peripheral face that communicates with the space between said opposed ends, a groove disposed in and extending longitudinally of one edge face of the ring, and long shallow pressure-relief passages extending from said groove outwardly to the outer peripheral edge of the ring, said passages being arranged on substantially diametrically opposite sides of the ring and midway between said split and the portion of the ring opposite the split.

7. A piston ring having an edge face provided with a surface for sealing the joint between the piston ring and a piston, said edge face also having a groove therein disposed outside such sealing surface, and an elongated, circumferentially extending passage leading outwardly from the said groove.

In testimony whereof I hereunto affix my signature.

MIDDLETON S. GILL.